(12) United States Patent
Huda

(10) Patent No.: US 9,778,759 B2
(45) Date of Patent: Oct. 3, 2017

(54) USER INTERFACE ASSEMBLY

(71) Applicant: Kashif Huda, Edison, NJ (US)

(72) Inventor: Kashif Huda, Edison, NJ (US)

( * ) Notice: Subject to any disclaimer, the term of this patent is extended or adjusted under 35 U.S.C. 154(b) by 40 days.

(21) Appl. No.: 14/832,464

(22) Filed: Aug. 21, 2015

(65) Prior Publication Data
US 2017/0052609 A1 Feb. 23, 2017

(51) Int. Cl.
*G06F 3/0354* (2013.01)
(52) U.S. Cl.
CPC .................. *G06F 3/03543* (2013.01)
(58) Field of Classification Search
USPC ......................................... 345/163
See application file for complete search history.

(56) References Cited

U.S. PATENT DOCUMENTS

| | | | |
|---|---|---|---|
| D438,208 S | 2/2001 | Jones et al. |
| 6,525,713 B1 | 2/2003 | Soeta et al. |
| 6,556,150 B1 | 4/2003 | McLoone |
| 7,463,242 B2 | 12/2008 | Kirtley et al. |
| 7,620,915 B2 | 11/2009 | Ludwig |
| 8,154,516 B2 | 4/2012 | Wu |
| 2014/0062883 A1 | 3/2014 | Bohn |

*Primary Examiner* — Gustavo Polo

(57) ABSTRACT

A user interface assembly includes an interface that may be in electrical communication with an extrinsic electronic device. The interface may be manipulated such that the interface converts hand and finger motions into vertical scrolling commands and horizontal scrolling commands. A control circuit is positioned within the interface. The control circuit is in electrical communication with the extrinsic electronic device.

5 Claims, 4 Drawing Sheets

US 9,778,759 B2

USER INTERFACE ASSEMBLY

BACKGROUND OF THE DISCLOSURE

Field of the Disclosure

The disclosure relates to interface devices and more particularly pertains to a new interface device for facilitating horizontal scrolling and vertical scrolling on a personal computer.

SUMMARY OF THE DISCLOSURE

An embodiment of the disclosure meets the needs presented above by generally comprising an interface that may be in electrical communication with an extrinsic electronic device. The interface may be manipulated such that the interface converts hand and finger motions into vertical scrolling commands and horizontal scrolling commands. A control circuit is positioned within the interface. The control circuit is in electrical communication with the extrinsic electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
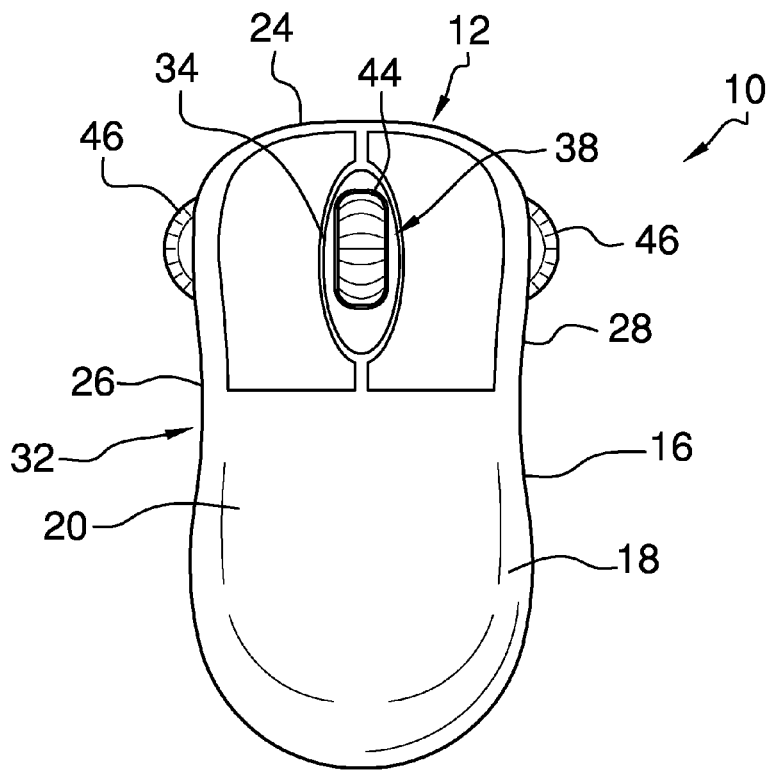
FIG. 1 is a top view of a user interface assembly according to an embodiment of the disclosure.
Figure 2:
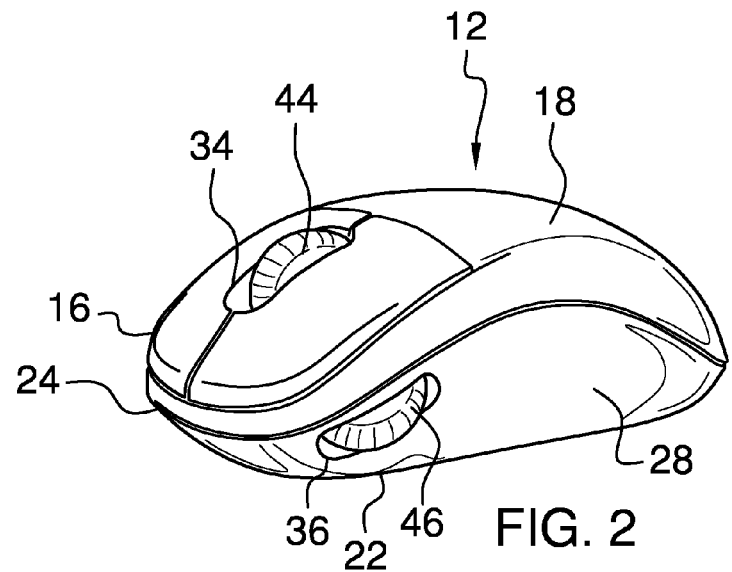
FIG. 2 is a perspective view of an embodiment of the disclosure.
Figure 3:
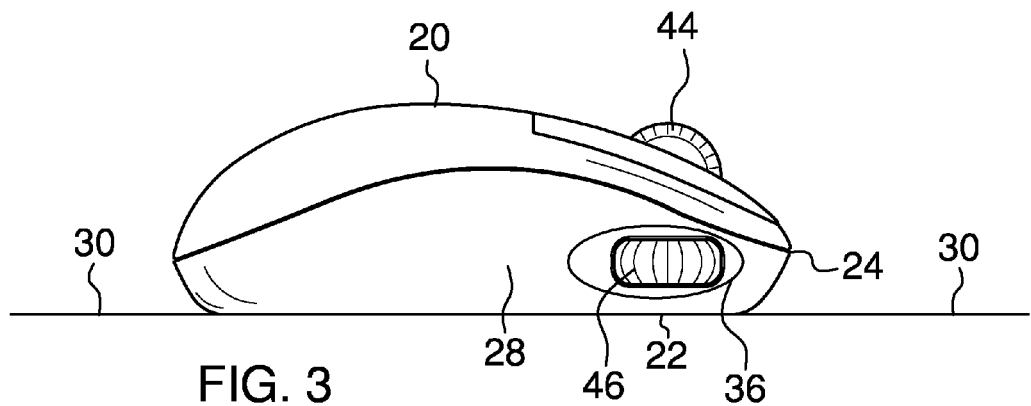
FIG. 3 is a right side view of an embodiment of the disclosure.
Figure 4:
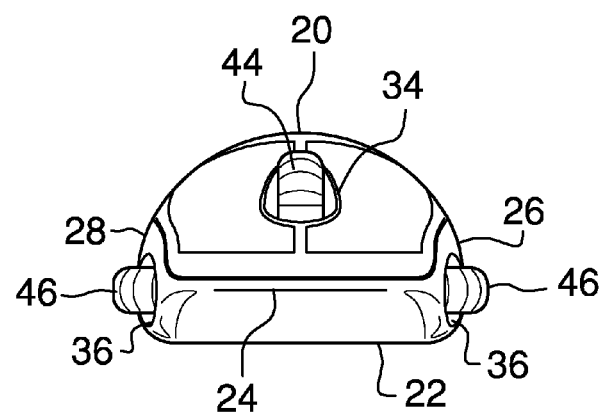
FIG. 4 is a front view of an embodiment of the disclosure.
Figure 5:
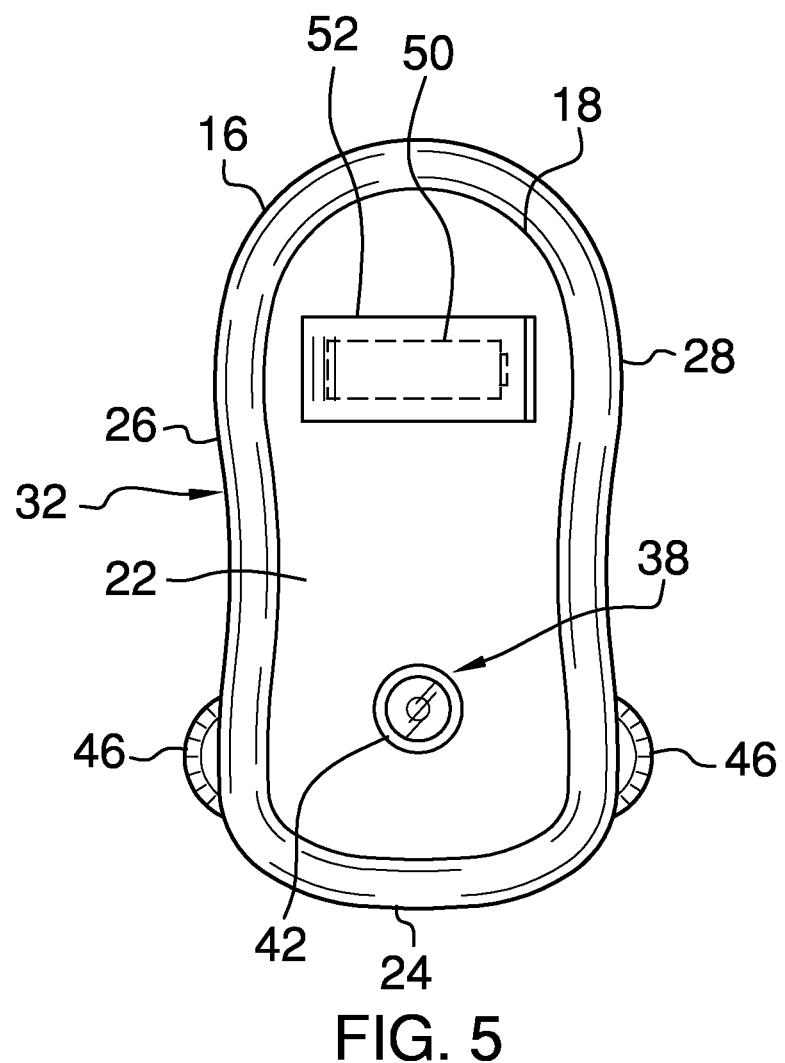
FIG. 5 is a bottom view of an embodiment of the disclosure.
Figure 6:
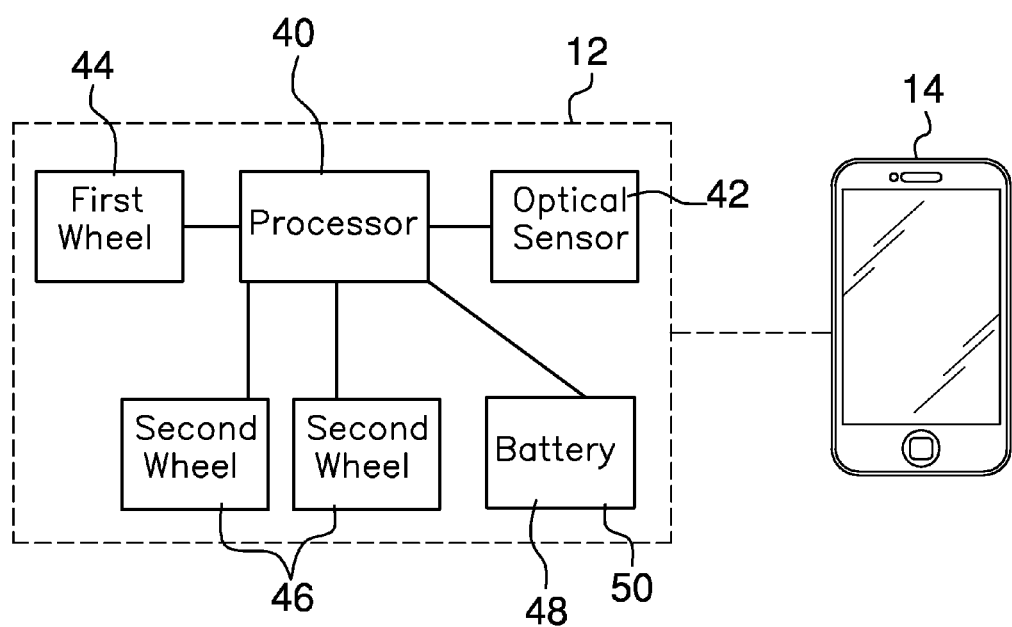
FIG. 6 is a schematic view of an embodiment of the disclosure.

With reference now to the drawings, and in particular to FIGS. 1 through 6 thereof, a new interface device embodying the principles and concepts of an embodiment of the disclosure and generally designated by the reference numeral 10 will be described.

As best illustrated in FIGS. 1 through 6, the user interface assembly 10 generally comprises an interface 12 that may be in electrical communication with an extrinsic electronic device 14. The extrinsic electronic device 14 may be a personal computer and the interface 12 may comprise a computer mouse. The interface 12 maybe manipulated such that the interface 12 converts hand and finger motions into vertical scrolling commands and horizontal scrolling commands.

The interface 12 comprises a housing 16 that has an outer wall 18. The outer wall 18 has a top side 20, a bottom side 22, a front side 24, a first lateral side 26 and a second lateral side 28. The housing 16 may be positioned on a support surface 30 having the bottom side 22 abutting the support surface 30. Each of the first lateral side 26 and the second lateral side 28 curve inwardly proximate a center 32 of the housing 16.

The top side 20 has a first slot 34 extending therethrough and the first slot 34 is centrally positioned on the top side 20. The first slot 34 is positioned adjacent to the front side 24. The outer wall 18 has a pair of second slots 36 extending therethrough. Each of the second slots 36 is positioned on an associated one of the first lateral side 26 and the second lateral side 28. Each of the second slots 36 is positioned adjacent to the front side 24.

A control circuit 38 is positioned within the housing 16 and the control circuit 38 is in electrical communication with the extrinsic electronic device 14. The control circuit 38 includes a processor 40 that is positioned within the housing 16. The processor 40 is in electrical communication with the extrinsic electronic device 14. An optical sensor 42 is positioned on the bottom side 22 and the optical sensor 42 detects when the housing 16 is urged along the support surface 30. The optical sensor 42 is electrically coupled to the processor 40.

A first wheel 44 is rotatably coupled to the housing 16. The first wheel 44 is positioned within the first slot 34 such that the first wheel 44 may be manipulated. The first wheel 44 is electrically coupled to the processor 40. The first wheel 44 generates an up scroll command and a down scroll command when the first wheel 44 is urged to rotate in a corresponding direction.

A pair of second wheels 46 is provided and each of the second wheels 46 is rotatably coupled to the housing 16. Each of the second wheels 46 is positioned within an associated one of the second slots 36. Thus, a selected one of the second wheels 46 may be manipulated by a left handed user and a right handed user. Each of the second wheels 46 is electrically coupled to the processor 40. Thus, each of the second wheels 46 generates a left scroll command and a right scroll command when the each of the second wheels 46 is rotated in a corresponding direction.

A power supply 48 is positioned with the housing 16 and the power supply 48 is electrically coupled to the processor 40. The power supply 48 comprises at least one battery 50. A battery cover 52 is removably coupled to the bottom side 22. The battery 50 is positioned beneath the battery cover 52.

In use, the housing 16 is manipulated on the support surface 30 in the convention of utilizing a computer mouse. The first wheel 44 is manipulated to scroll upwardly and downwardly on the extrinsic electronic device 14. A selected one of the second wheels 46 is manipulated by the right handed user or the left handed user. The selected second wheel 46 is rotated to scroll to the left and to scroll to the right on the extrinsic electronic device 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A user interface assembly configured to be in electrical communication with a personal computer, said assembly comprising:
   an interface being configured to be in electrical communication with an extrinsic electronic device, said interface being configured to be manipulated such that said interface converts hand and finger motions into vertical scrolling commands and horizontal scrolling commands, wherein said interface comprises a housing having an outer wall, said outer wall having a top side, a bottom side, a front side, a first lateral side and a second lateral side, said housing being configured to be positioned on a support surface having said bottom side abutting the support surface, said housing having a first slot, said housing having a pair of second slots;
   a control circuit being positioned within said interface, said control circuit being configured to be in electrical communication with the extrinsic electronic device, wherein said control circuit includes:
      a processor being positioned within said housing, said processor being configured to be in electrical communication with the extrinsic electronic device, and
      an optical sensor being positioned on said bottom side wherein said optical sensor is configured to detect when said housing is urged along the support surface, said optical sensor being electrically coupled to said processor;
   a first wheel being rotatably coupled to said housing, said first wheel being positioned within said first slot wherein said first wheel is configured to be manipulated, said first wheel being electrically coupled to said processor wherein said first wheel is configured to generate a up scroll command and a down scroll command when said first wheel is urged to rotated in a corresponding direction; and
   a pair of second wheels, each of said second wheels being rotatably coupled to said housing, each of said second wheels being positioned within an associated one of said second slots wherein each of said second wheels is configured to be manipulated by a left handed user and a right handed user, each of said second wheels being electrically coupled to said processor wherein each of said second wheels is configured to generate a left scroll command and a right scroll command when a selected one of said second wheels is rotated in a corresponding direction.

2. The assembly according to claim 1, wherein said top side having a first slot extending therethrough, said first slot being centrally positioned on said top side, said first slot being positioned adjacent to said front side.

3. The assembly according to claim 2, wherein said outer wall having a pair of second slots extending therethrough, each of said second slots being positioned on an associated one of said first lateral side and said second lateral side, each of said second slots being positioned adjacent to said front side.

4. The assembly according to claim 1, further comprising a power supply being positioned with said housing, said power supply being electrically coupled to said processor, said power supply comprising at least one battery.

5. A user interface assembly configured to be in electrical communication with a personal computer, said assembly comprising:
   an interface being configured to be in electrical communication with an extrinsic electronic device, said interface being configured to be manipulated such that said interface converts hand and finger motions into vertical scrolling commands and horizontal scrolling commands, said interface comprising:
      a housing having an outer wall, said outer wall having a top side, a bottom side, a front side, a first lateral side and a second lateral side, said housing being configured to be positioned on a support surface having said bottom side abutting the support surface, said top side having a first slot extending therethrough, said first slot being centrally positioned on said top side, said first slot being positioned adjacent to said front side, said outer wall having a pair of second slots extending therethrough, each of said second slots being positioned on an associated one of said first lateral side and said second lateral side, each of said second slots being positioned adjacent to said front side,
      a control circuit being positioned within said housing, said control circuit being configured to be in electrical communication with the extrinsic electronic device, said control circuit including:
         a processor being positioned within said housing, said processor being configured to be in electrical communication with the extrinsic electronic device,
         an optical sensor being positioned on said bottom side wherein said optical sensor is configured to detect when said housing is urged along the support surface, said optical sensor being electrically coupled to said processor,
         a first wheel being rotatably coupled to said housing, said first wheel being positioned within said first slot wherein said first wheel is configured to be manipulated, said first wheel being electrically coupled to said processor wherein said first wheel is configured to generate a up scroll command and a down scroll command when said first wheel is urged to rotated in a corresponding direction,
         a pair of second wheels, each of said second wheels being rotatably coupled to said housing, each of said second wheels being positioned within an associated one of said second slots wherein each of said second wheels is configured to be manipulated by a left handed user and a right handed user, each of said second wheels being electrically coupled to said processor wherein each of said second wheels is configured to generate a left scroll command and a right scroll command when a selected one of said second wheels is rotated in a corresponding direction, and a power supply being positioned with said housing, said power supply being electrically coupled to said processor, said power supply comprising at least one battery.

* * * * *